United States Patent
Aggeler

(10) Patent No.: US 6,533,232 B1
(45) Date of Patent: Mar. 18, 2003

(54) HOLDER AND SLEEVE FOR A BEVERAGE

(76) Inventor: Konrad Aggeler, Santisstr. 21, 88097 Eriskirch (DE)

( * ) Notice: Subject to any disclaimer, the term of this patent is extended or adjusted under 35 U.S.C. 154(b) by 0 days.

(21) Appl. No.: 09/564,216

(22) Filed: May 4, 2000

(51) Int. Cl.[7] .............................................. A47G 29/00
(52) U.S. Cl. ............................... 248/311.2; 248/309.1; 220/737; 220/739
(58) Field of Search ...................... 248/311.2, 309.1, 248/231.21, 231.41; 220/903, 739, 671, 675, 737

(56) References Cited

U.S. PATENT DOCUMENTS

| | | | | |
|---|---|---|---|---|
| 4,183,226 A | * | 1/1980 | Moore | 62/457 |
| 4,852,843 A | * | 8/1989 | Chandler | 248/311.2 |
| 4,892,137 A | * | 1/1990 | Bibik, Jr. | 165/80.1 |
| 4,892,138 A | * | 1/1990 | Bibik, Jr. | 165/80.1 |
| 5,165,646 A | * | 11/1992 | Gewecke | 248/311.2 |
| 5,259,529 A | * | 11/1993 | Coale | 220/739 |
| 5,579,946 A | * | 12/1996 | Rowan et al. | 220/420 |
| 5,669,538 A | * | 9/1997 | Ward | 224/539 |
| 5,913,452 A | * | 6/1999 | Weigl | 220/737 |
| 6,053,352 A | * | 4/2000 | Cai | 220/739 |
| 6,082,114 A | * | 7/2000 | Leonoff | 62/3.64 |
| 6,155,063 A | * | 12/2000 | Felde | 62/244 |

* cited by examiner

Primary Examiner—Anita King
Assistant Examiner—Steven Marsh
(74) Attorney, Agent, or Firm—Baker & McKenzie

(57) ABSTRACT

A device for using the heating and cooling system of a car to control the temperature of a beverage in a container, such as a can of soda. A sleeve of soft foam has a series of channels formed on its inside surface. Ribs are disposed between the channels to hold the can in the sleeve. The channels receive air (warm or cool, as desired) directed to the channels from the lower end of the sleeve. The sleeve is preferably used with a holder designed to force air flowing horizontally from a vent of a car into the vertical channels of the sleeve.

8 Claims, 5 Drawing Sheets

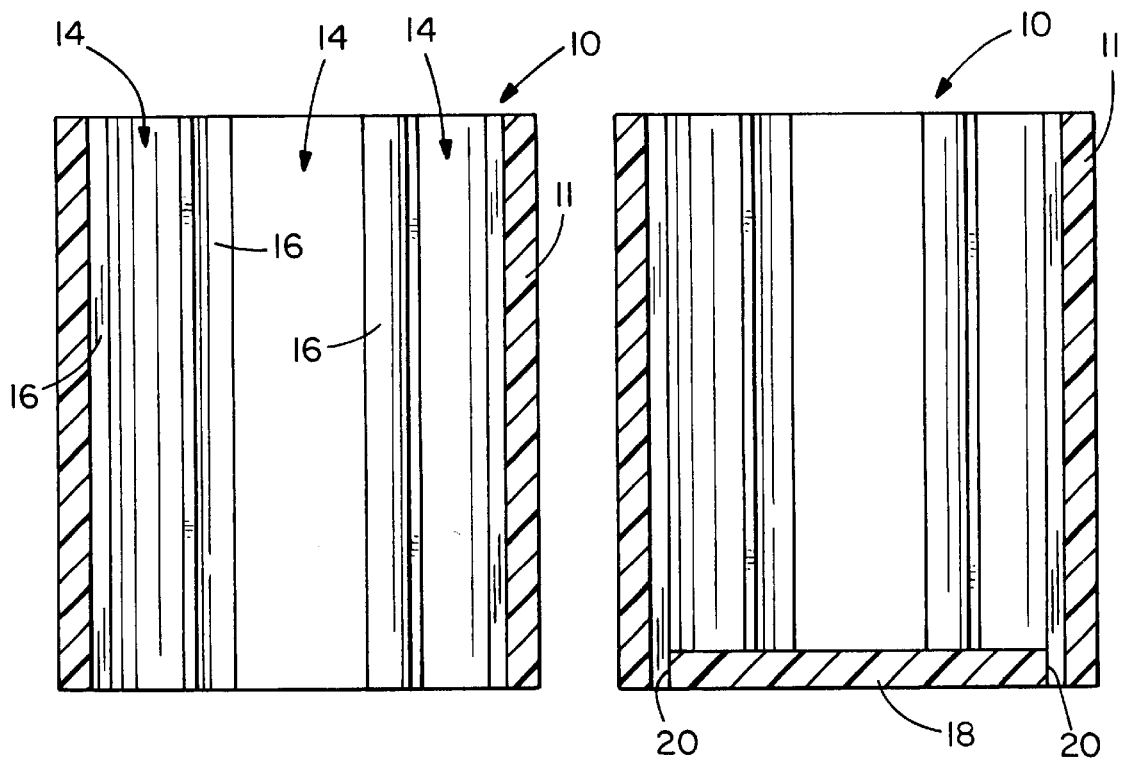
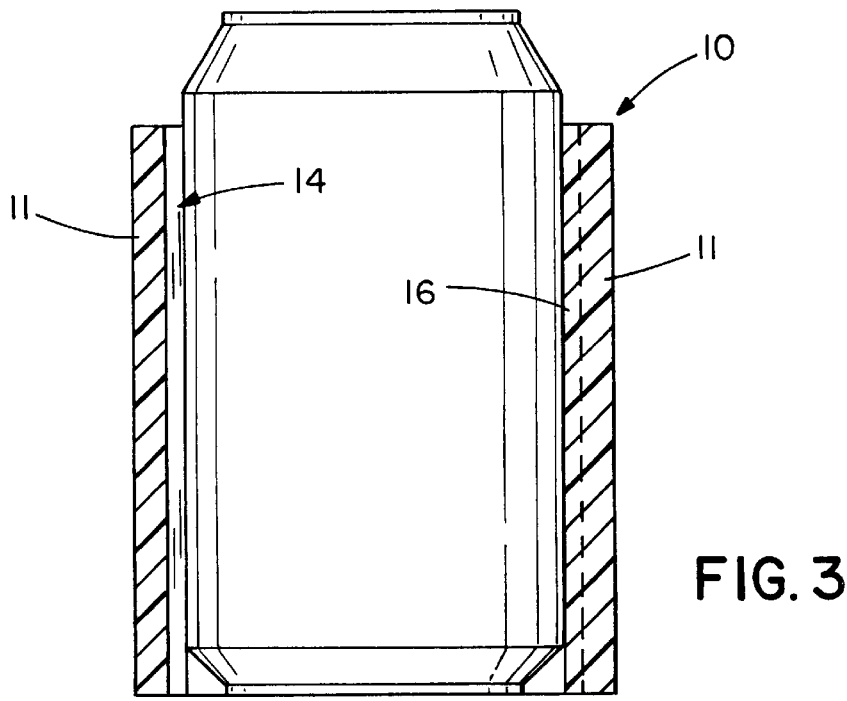

HOLDER AND SLEEVE FOR A BEVERAGE

BACKGROUND AND SUMMARY OF THE INVENTION

The present invention relates to devices for use in vehicles, and in particular, for controlling the temperature of a beverage by use of the air-conditioning and heating systems of a vehicle.

A number of such devices have been proposed. For example, the device shown in U.S. Pat. No. 5,913,452 has helically shaped ducts formed on the inside surface of a container which is affixed to the louvers of a car's heating/air-conditioning vents. An earlier example is shown in U.S. Pat. No. 4,852,843. In the '843 patent, a wire support for an item, such as a beverage can, is covered with a jacket with vertically oriented windows which allow cool or warm air from a vehicle's A/C or heater to flow horizontally across the beverage container, keeping it warm or cool.

For years, foam sleeves of various kinds have been used to insulate 12 ounce beverage cans. For example, such foam sleeves are sold under the brand name KOOZIE® by the Norwood Company. (See http://www.rcc-koozie.com). Such foam sleeves are in widespread use and are a well-accepted technique for providing insulation for canned beverages and are most commonly used to keep ambient heat from warming the contents of a 12 ounce can of soda (i.e., pop).

The present invention includes a modified foam sleeve which is adapted to cooperate with a holder affixed to the louvers of a vehicle's heating/cooling system. A sleeve of the general type which is commonly known is modified to include internal chambers extending from the bottom edge of the sleeve to the top. A holder shaped to receive the sleeve (and a can carried thereby) is affixed to the louvers of a vent on the interior of a car. The sleeve and the can are intended to be lifted out of the holder together as a standard KOOZIE® sleeve would be. The user will then use the foam sleeve (with the can inside) like a regular foam rubber insulating sleeve. However, when the internally channeled sleeve of the present invention is placed in the holder, the shape of the holder causes cool (or warm) air emanating from the vent to flow upwardly through the channels of the inside of the sleeve. This promotes the cooling or heating of the can held by the channelled sleeve of the present invention.

The advantages and benefits of the present invention will be better understood by referring to the accompanying drawings.

BRIEF DESCRIPTION OF THE DRAWINGS

FIG. 2 is a longitudinal vertical cross-section of a sleeve of the present invention.

FIG. 2A is an enlarged cross-section of a sleeve of the present invention with a bottom attached to the inside of the lower end of the sleeve.

FIG. 3 is an elevational view in partial section of a can being insulated by a sleeve of the present invention.

DETAILED DESCRIPTION OF THE INVENTION

Figure 1:
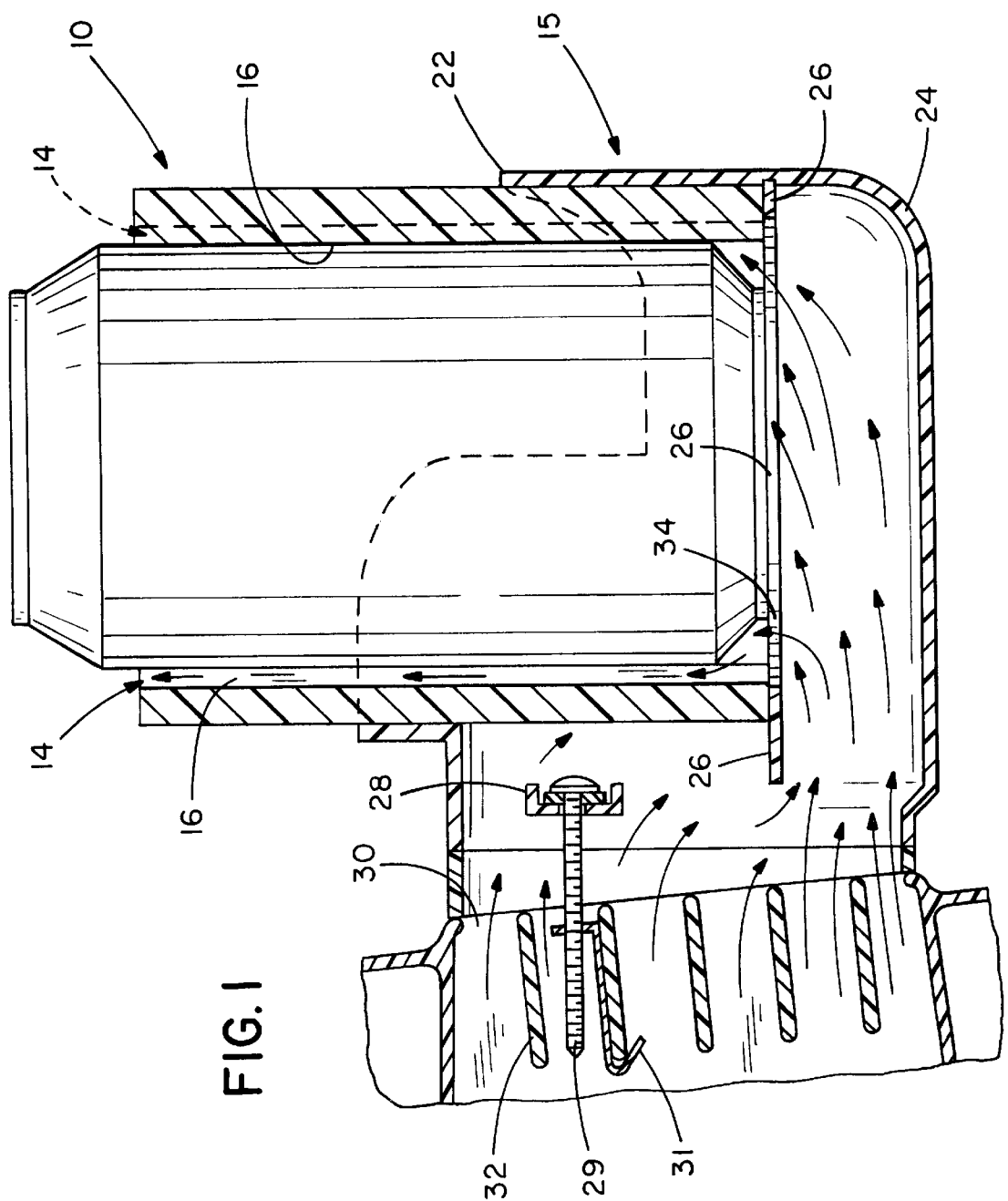
FIG. 1 is a cross-sectional view of a sleeve and holder of the present invention attached to louvers of a vent.

FIG. 1 is a cross-sectional view of the present invention which shows a sleeve 10 surrounding a can 12 held within a holder 15. The holder 15 has a upper cup 22 and a lower cup 24. The lower cup 24 directs air emanating from a vent 30 through a passageway 34. The air flow is shown by arrows in FIG. 1. The air passes through channels 14 formed on the inside surface of the sleeve 10. The channels 14 are separated by ribs 16. The channels 14 are completed by a continuous wall 11 forming the outside surface of the sleeve 10.

The holder 15 is shown as being attached to louvers 32 which cover the vent 30. A fastener 29 is used to attach the holder 15 to a louver 32 with the cooperation of a clip 31. The head of the fastener 29 extends through a crossbar 28 bridging one side of the upper cup 22 with another side of the upper cup (see FIG. 8). FIG. 3 shows that the width of the flange 26 is preferably small enough to allow free flow of air in an upward direction through passageway 34 into the channels 14. That is, the flange 26 should not block flow of air into the channels 14. The passageway 34 between the lower cup 24 and the upper cup 22 is defined by the flange 26. The flange 26 provides a vertical stop beyond which the sleeve 10 may not slide downwardly.

FIG. 2 is a longitudinal section showing the ribs 16 and channels 14 of a sleeve 10 of the present invention.

FIG. 2A shows a sleeve 10 of the present invention to which a disk 18 has been attached at the lower end thereof at attachment points 20 from the lower end of the ribs 16. The disk may be solid (as shown) or it may be a more web-like structure which simply prevents the inadvertent slipping of a can through the sleeve in the event that the can is of a size which is smaller in diameter than a standard 12 ounce can. Whatever the shape of the bottom, it should allow the flow of air to and through the channels 14. The diameter defined by the inside surface of the ribs 16 is smaller than the diameter defined by the outside surface of a standard 12 ounce can, so that a gripping action between the sleeve and the can is obtained.

Figure 4:
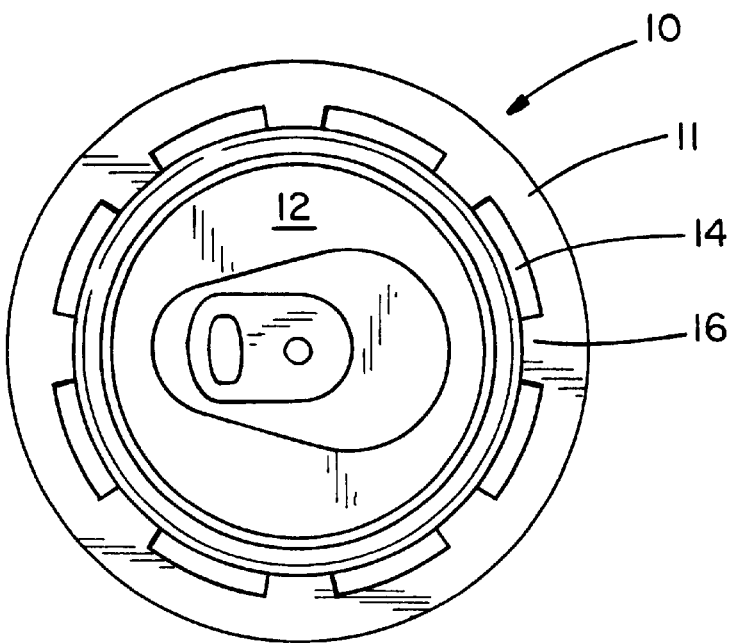
FIG. 4 is a top plan view of the can and sleeve shown in FIG. 3.
Figure 5:
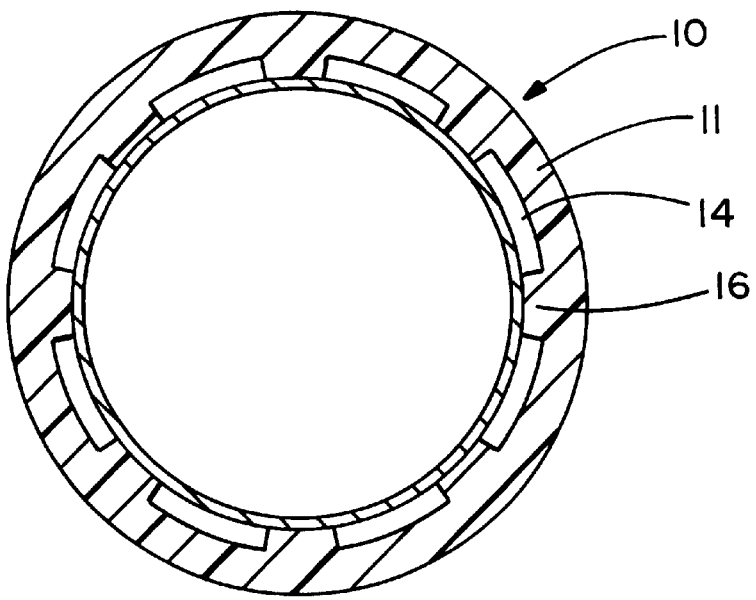
FIG. 5 is a horizontal sectional view of the can and sleeve of FIG. 3.

FIG. 3 is an elevational view in partial section showing a can 12 and a sleeve 10. As can be seen in FIGS. 4 and 5, the channels 14 are disposed about the entire periphery of the can 12. As can best be seen in FIGS. 4 and 5, the relative size of the ribs 16 and the channels 14 are such that a substantial majority of the outside surface of the can 12 is exposed to air passing through the channels 14.

Figure 6:
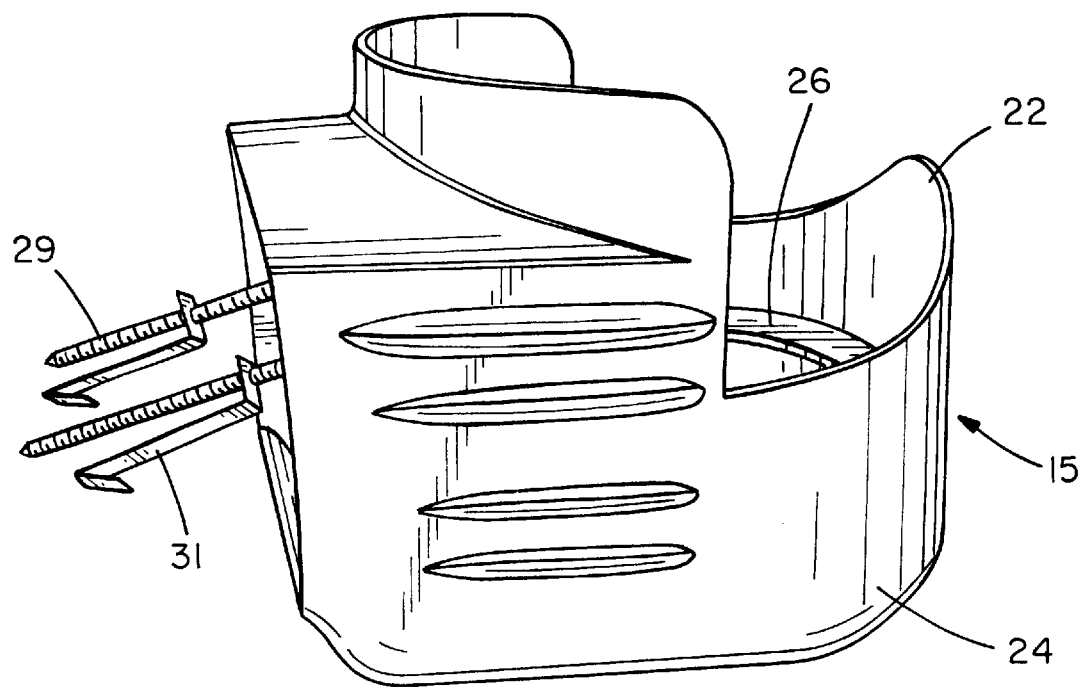
FIG. 6 is a perspective view of a holder of the present invention with attachment devices extending from the left side thereof.

FIG. 6 is a perspective view of a holder 15 with a pair of fasteners 29 (and their associated clips 31) extending rearwardly from the portion of the holder 15 which abutts a vent 30 (see FIG. 1). As can be clearly seen from FIG. 6, the upper cup 22 and lower cup 24 are integrally formed as a single molded object. For ease of molding, however, the holder 15 may be constructed of two or more pieces and may be snapped, glued or otherwise fastened together in an assembly operation.

Figure 7:
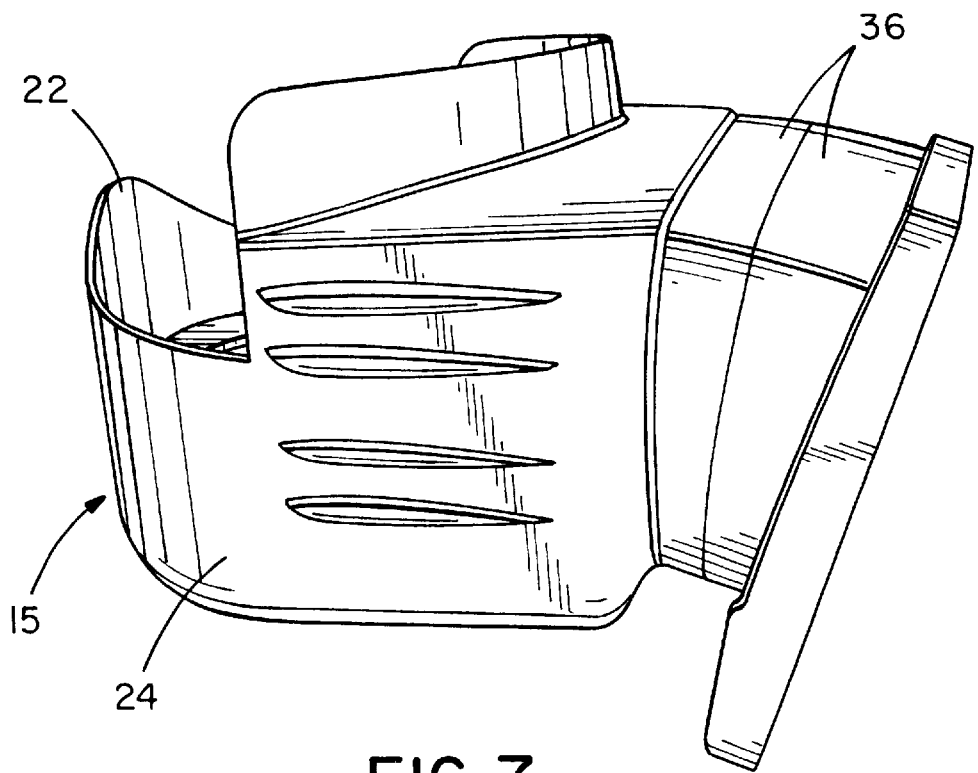
FIG. 7 is a perspective view of a holder of the present invention in combination with shim-like adapters to align the holder.

FIG. 7 is a perspective view of a holder 15 to which has been added wedge-like shims 36. The shims 36 may be inserted at the interface between the holder 15 and the louvers 32 to which the holder 15 is attached. The shims 36 are wedge-shaped to help bring the holder 15 to a position in which a can 12 held by the holder 15 will be in a generally vertical orientation.

Referring to FIG. 1, in order for large volumes of warm or cool air to be forced through the channels 14, the outside diameter of the sleeve 10 should be slightly greater than the inside diameter of the upper cup 22. This relationship will create a snug interface between the sleeve 10 and the cup 22 so that air in the lower cup will have a tendency to follow the paths defined by the channels 14. The upper end of the upper cup 22 may have a tapered or funnel-shaped configuration to facilitate the placement of the sleeve/can combination into the upper cup 22 when the user has taken a sip from the can and is ready to put the sleeve/can combination back into the holder.

The length of the sleeve 10 relative to the can should be such that when the bottom of the can and the bottom of the sleeve are at the same elevation, the can protrudes slightly from the upper end of the sleeve. This leaves an area just below the top of the can for a user's lower lip to engage the upper portion of the side of the can. If a sleeve bottom 18 (see FIG. 2A) is used, the overall length of the sleeve may be slightly greater than a sleeve having no bottom.

Figure 8:
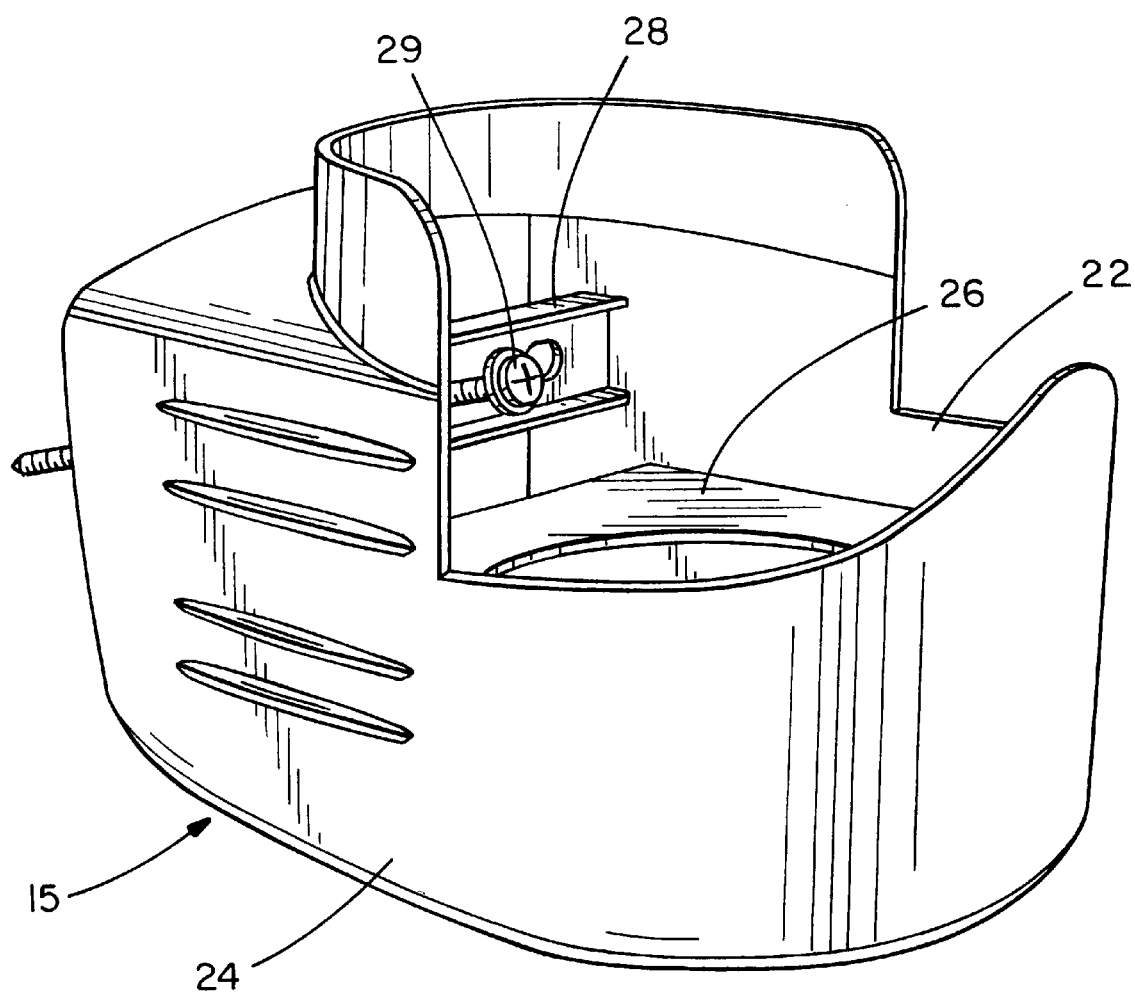
FIG. 8 is a perspective view of a holder of the present invention showing the flange and crossbar thereof.

FIG. 8 is a further perspective view of the holder 15. This figure shows the cross-bar 28 extending from one side of the upper cup 22 to the other. FIG. 8 also shows how the flange 26 similarly bridges from one side of the upper cup 22 to the other.

While the present invention has been shown and described with respect to a particular embodiment, it will be recognized by persons of ordinary skill in the art that a number of modifications, variations and improvements may be made to the embodiment shown herein without departing from the spirit and scope of the following claims.

What is claimed is:

1. A device for holding and ventilating a container of liquid comprising:

a beverage holder attachable to a vent in a vehicle, a sleeve adapted to fit into and be removed from said holder, said sleeve having an open upper end and an at least partially open lower end, said sleeve having an interior surface with a plurality of air channels, said channels being open at both their upper ends and their lower ends, and a plurality of contact ribs extending in a generally axially direction substantially lengthwise along said interior surface to provide a pathway for flow of air from one end of said sleeve to another;

said ribs define a first surface area adapted to contact and frictionally engage a can placed in said sleeve whereby said sleeve allows air to flow in an axial direction through said air channels when said sleeve is in said holder, and allows said sleeve to be used as an insulating wrap for said can when said sleeve is removed from said holder, and whereby air from said vehicle vent is adapted to be directed along said channels.

2. A device for holding and ventilating a container of liquid in accordance with claim 1 wherein:

said sleeve has an open bottom.

3. A device for holding and ventilating a container of liquid in accordance with claim 1 wherein:

said sleeve is partially closed at its bottom end by a disk connected to said lower portions of said ribs.

4. A device for holding and ventilating a container of liquid in accordance with claim 1 in combination with an aluminum can having a pre-determined outside diameter, wherein:

said sleeve is made of a resilient foamed material and said first surface area defined by said ribs defines a first inside diameter of said sleeve, said inside diameter being less than said pre-determined outside diameter, whereby said sleeve may be expanded into gripping engagement with a standard 12 ounce aluminum can so as to support said can by friction between said ribs and an extended surface of said can.

5. A device for holding and ventilating a container of liquid in accordance with claim 1 wherein:

said device further comprises a holder for said sleeve, said holder having a sleeve-holding receptacle, a lower chamber disposed beneath said receptacle, and a passageway connecting said lower chamber to said sleeve-holding receptacle, said chamber having an open side for receiving air from a vent, said sleeve-holding receptacle having an upper inside diameter large enough to allow said sleeve and a can held thereby to be inserted into said receptacle, and said sleeve-holding receptacle having a lower inside diameter small enough to prevent said sleeve from moving into said chamber.

6. A device for holding and ventilating a container of liquid in accordance with claim 5 wherein:

said holder includes fasteners adapted to grippingly engage a portion of a vehicle and to support said holder with said receptacle facing upwardly.

7. A device for holding and ventilating a container of liquid in accordance with claim 5 wherein:

said receptacle and said lower chamber are separated by a flange extending inwardly from an inside surface of said holder, said flange defining said passageway.

8. A device for holding and ventilating a container of liquid in accordance with claim 5 wherein:

said lower chamber is formed by a cup-like member having an open side and an open top, and closed bottom, front and sides, and said receptacle is formed by a second cup-like member with an open bottom, said second cup-like member being disposed directly above said first cup-like member.

* * * * *